United States Patent [19]

Bione et al.

[11] Patent Number: 4,707,827
[45] Date of Patent: Nov. 17, 1987

[54] BRIDGING TECHNIQUES FOR LOCAL AREA NETWORKS

[75] Inventors: Angelo A. Bione, Elmhurst; Semir Sirazi, Chicago, both of Ill.

[73] Assignee: Zenith Electronics Corporation, Glenview, Ill.

[21] Appl. No.: 842,518

[22] Filed: Mar. 21, 1986

[51] Int. Cl.⁴ ............................................. H04J 3/02
[52] U.S. Cl. ....................................... 370/85; 370/88
[58] Field of Search .................... 370/85, 86, 88, 89

[56] References Cited

U.S. PATENT DOCUMENTS 4,577,313 3/1986 Sy .......................................... 370/88

Primary Examiner—Douglas W. Olms
Assistant Examiner—Wellington Chin

[57] ABSTRACT

A communications system includes one or more channels each comprising a plurality of LANs having multiple stations. The LANs of a particular channel are interconnected by a bridge interface, the respective bridge interfaces being connected by a backbone network. Each station is capable of transmitting a data packet including a header having either a 0 or 1 bridge flag, LAN stations being responsive only to data packets having a 0 bridge flag and bridge interfaces only to packets having a 1 bridge flag. Intra-LAN communications are thus effected by data packets having headers with 0 bridge flages while inter-LAN communications are effected by transmitting a packet with a 1 bridge flag from a source station which is coupled to the destination station by the bridge which also changes the bridge flag to 0. A special "broadcast" header is used to effect communications when the LAN or channel of the destination station is unknown.

12 Claims, 7 Drawing Figures

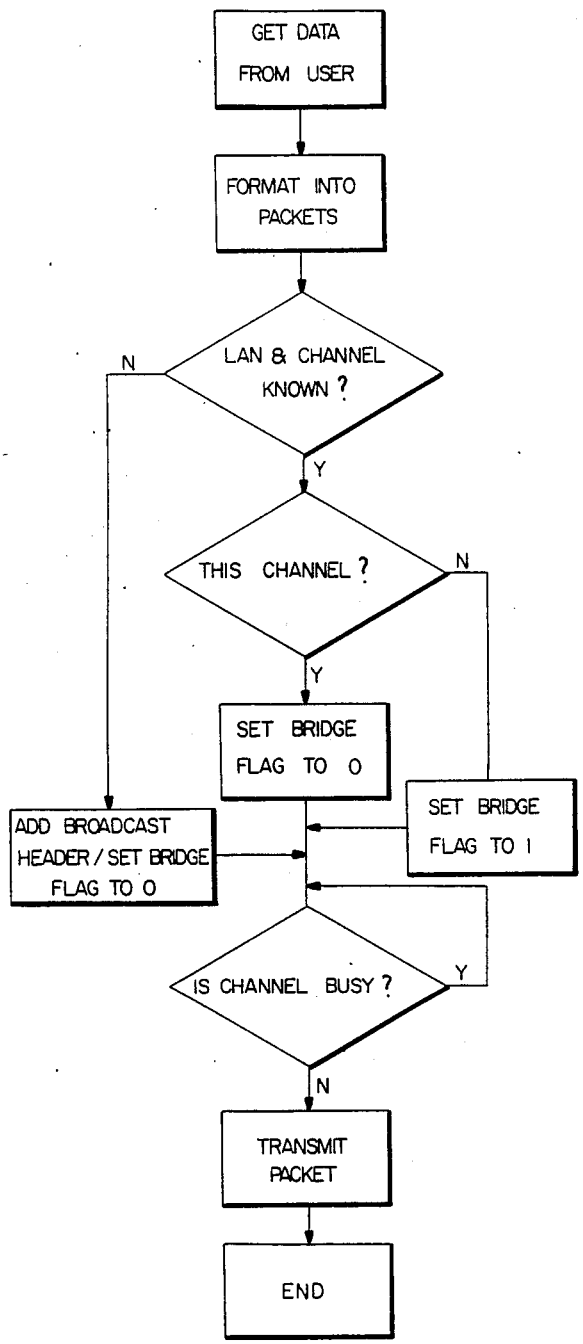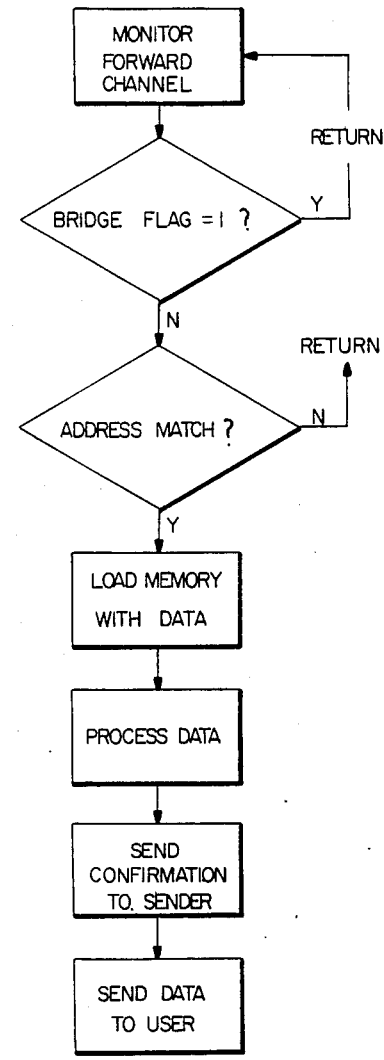
FIG. 6
FIG. 7

BRIDGING TECHNIQUES FOR LOCAL AREA NETWORKS

BACKGROUND OF THE INVENTION

The present invention relates generally to communication networks such as local area networks (LANs) and particularly concerns a technique for facilitating communications between different LANs.

LANs utilizing various protocols for enabling communications among their constituent stations are generally well known in the art. Among the more common of such protocols are "token ring", "slotted aloha" and carrier sense multiple access with collision detection (CSMA/CD). The interconnection of LANs utilizing different protocol may be effected by a control interface normally referred to as a "gateway", whereas LANs using the same protocol are interconnected by a control interface referred to as a "bridge".

Prior art bridge interfaces commonly comprise so-called memory look-up tables for providing a cross-reference between each station connected to the bridge interface (bridge) and the LAN in which the respective station is situated. More particularly, the memory look-up tables are used to store a plurality of addresses, each identifying a respective station, together with a code identifying the particular LAN to which the station belongs. When a message is directed via the bridge to a given destination station, the memory look-up table is searched to locate the stored address code of the destination station for determining the LAN to which the station belongs. For stations in LANs serviced by different bridges, an interbridge address is created and put in temporary memory when the message is forwarded to the next bridge. The process is repeated for each message, with the bridge directing the message to the appropriate LAN for receipt by the destination station. Return messages are routed through the bridge in a reverse sequence with the temporary addresses being referred to each time. While the foregoing procedure normally operates satisfactorily, the use of such look-up tables and interbridge addresses to effect communications between stations of different LANs is hardware intensive and therefore a relatively costly as well as a low-speed technique.

OBJECTS OF THE INVENTION

It is accordingly a basic object of the invention to provide an improved technique for enabling communication between stations in a communications network.

It is a further object of the invention to provide a technique which may be implemented at a relatively low cost for facilitating high speed communications between stations of different LANs.

BRIEF DESCRIPTION OF THE DRAWINGS

These and other objects and advantages of the invention will be apparent upon reading the following description in conjunction with the drawings in which:

FIGS. 5, 6 and 7 are flow diagrams depicting certain aspects of bridge interface and station operation.

DESCRIPTION OF THE PREFERRED EMBODIMENT

Figure 1:
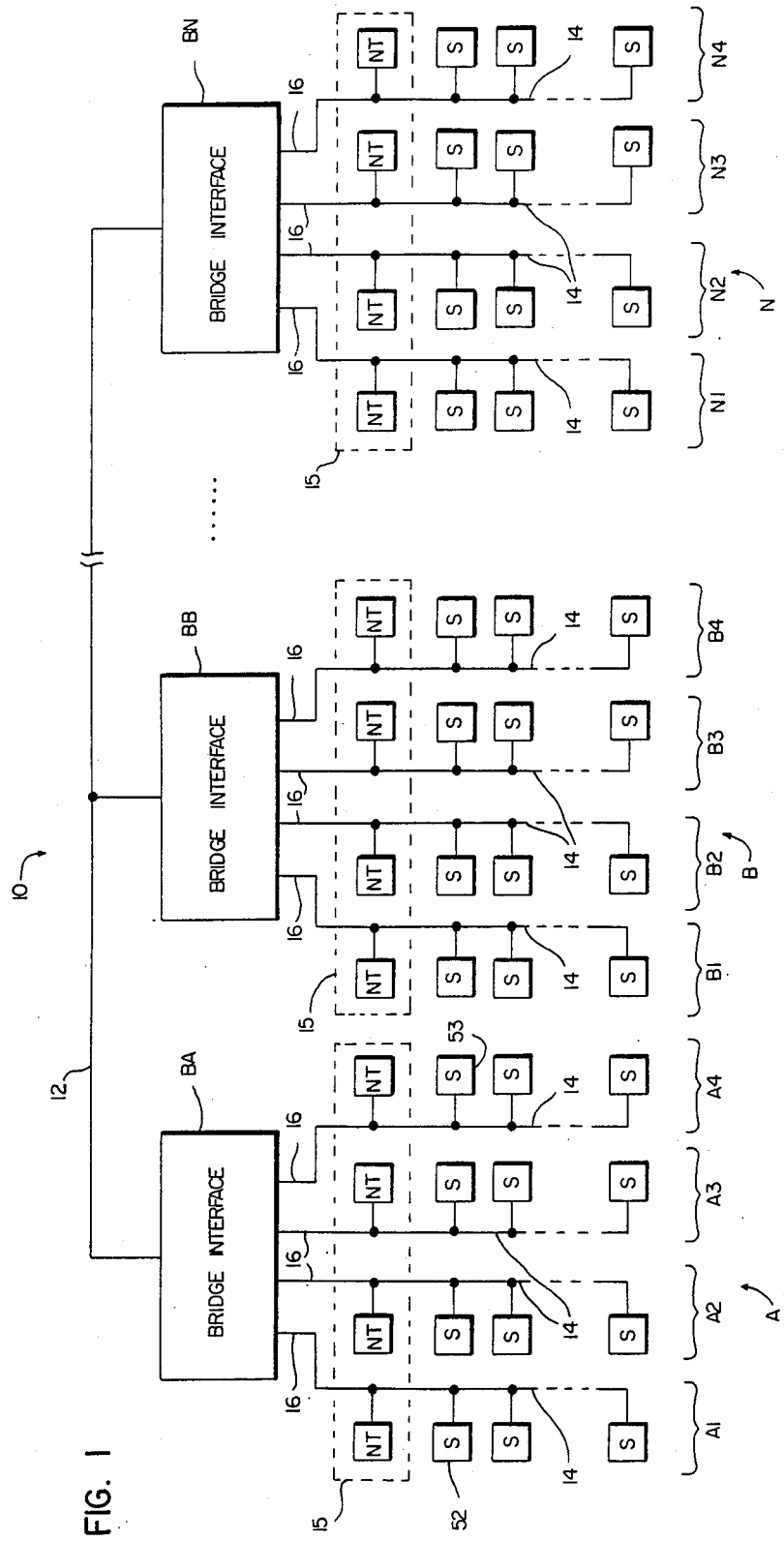
FIG. 1 is a simplified block diagram of a communications system incorporating a plurality of LANs in accordance with the invention.

FIG. 1 generally shows a communications system 10 constructed in accordance with the present invention. Communications system 10 comprises a plurality of communication networks A, B, ... N each comprising four LANs A1–A4, B1–B4 ... N1–N4, respectively. The LANs of each communications network A, B, ... N are connected to a respective bridge interface BA, BB, ... BN, the bridge interfaces being interconnected by a communications link 12. A plurality of stations are connected to a lesser plurality of cables, commonly referred to as cable plants 14. While each communications network in FIG. 1 is shown as comprising four LANS, it will be appreciated that this number can be varied as desired.

As previously mentioned, bridge interfaces of the type shown in FIG. 1 are used to interconnect LANs having the same communication protocol. While not limited thereto, for purposes of illustration, the LANs in FIG. 1 will be described in terms of a broadband network of the type that typically employs a two-way cable television (CATV) plant (cable) 14 or the like to facilitate data communications between a plurality of stations, labelled S, using CSMA/CD protocol. Inter-station communications in such LANs are effected by a source station SS transmitting an upstream message or data packet to a network translator (NT) which then retransmits the data packet downstream for reception by the desired destination station DS. For ease in understanding, the network translators are indicated as being individual units, each connected to the cable plant in each LAN in the communications network. In practice, a common network translator will serve all LANs or sub-channels and, to indicate this, the four NTs in each communications network are encircled by a dashed line 15.

The transmitted message packet comprises a header including address codes identifying both the destination station and the source station that enables receipt of the complete packet by both stations to verify the integrity of the received message. The packet also includes data indicating the type of message, i.e., whether it is a connection request or a connection confirmation. The upstream transmission from the source station is generally accomplished by means of an upstream channel (sometimes referred to as the reverse channel) typically having a carrier frequency ranging from 5 MHz to 35 MHz. The network translator converts the reverse channel carrier to a downstream channel frequency also referred to as the forward channel, and re-transmits the data packet on this channel.

In accordance with the CSMA/CD protocol, the source station defers upstream transmission of a formulated data packet until its forward channel is clear, i.e., no carrier is present on the channel. Even so, two or more source stations may transmit data packets at substantially the same time resulting in packet collisions which destroy the information content of the transmitted data. Data packet collisions may be detected by source stations in a number of ways, e.g., bit by bit comparisons, CRC comparisons, code violations, etc., and in response to which the source station abandons the remainder of the transmission. Subsequently, the source station may retransmit the data packet after a random delay so as to reduce the probability of further collision.

Each communications network A, B ... N comprises a 6 MHz wide channel with each LAN being assigned a 1 MHz sub-channel within its channel, the remainder of the channel being used as guard-band. For example, communications network A may comprise a 6 MHz wide channel extending between 24 MHz and 30 MHz, with each of LANs A1-A4 being assigned carriers f1-f4 located 1 MHz apart. The network translator NT block-converts the upstream (reverse channel) data packet transmissions on carriers f1-f4 from stations S of LANs A1-A4 to downstream (forward channel) transmissions on carriers F1-F4 occupying a 6 MHz channel extending between, for example, 170-176 MHz. It will be observed that the cable plant 14 of each LAN is coupled to a respective input of its associated bridge BA, BB ... BN by a line 16. As will be explained in further detail below, these connections facilitate communications between stations in different LANs of a particular network or between stations in LANs of different networks.

Figure 2:
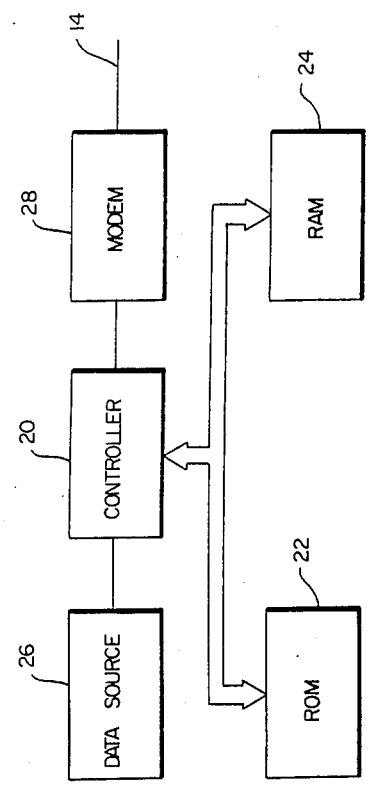
FIG. 2 is a block diagram of an exemplary LAN station.

A typical LAN station S is shown in block diagram form in FIG. 2. Its description will be understood to apply to all other stations as well. The station includes a microprocessor based controller 20 operating under the control of a program stored in a ROM 22. The station S further includes a RAM 24 for temporary data storage and a data source 26, both coupled to controller 20. Data source 26 may comprise any suitable source of ASCII data such as a personal computer. Controller 20 of station S is coupled to the cable plant 14 by an RF modem 28. With reference to the previous example, modem 28 may transmit data packets, formulated by controller 20, over the reverse channel of cable plant 14 to the network translator on a 1MHz sub-channel having a carrier frequency f1 and receive data packets on the forward channel of plant 14 from the network translator on a carrier having a frequency F1.

Figure 3:
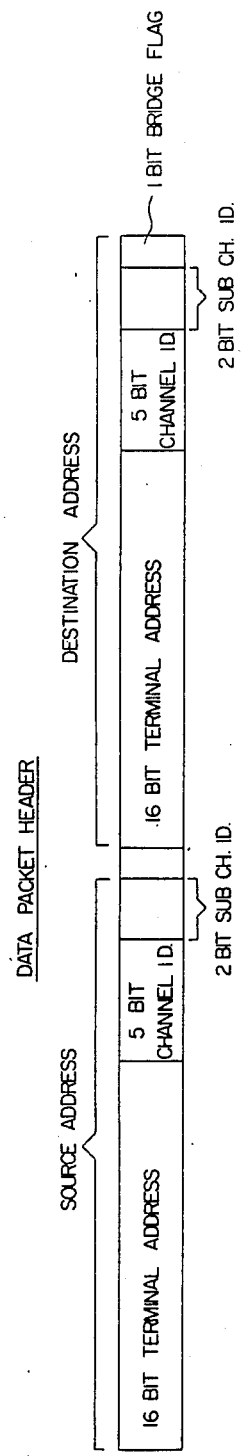
FIG. 3 depicts the arrangement of a message packet header.

Each data packet transmission originating with a station S is initially formulated by controller 20 in response to instructions stored in ROM 22. The data packet includes data supplied from data source 26, a header that defines the routing of the data packet and information as to the type of message. The origanization or format of the packet header is shown in FIG. 3. The first three bytes of the header represent the Destination Address and define the destination station while the last three bytes represent the Source Address and define the originating station. The first byte of the Destination Address comprises a 5-bit code identifying the 6 MHz channel or communications network (i.e., A, B ... N) in which the destination station is located, and a 2-bit code identifying the 1 MHz sub-channel or LAN (e.g., A1, A2, A3 or A4) of the destination station within the 6 MHz channel and a 1-bit bridge flag. The other two bytes of the Destination Address represent a 16-bit station address that uniquely identifies that station among all other stations served by the communications system. Two additional bytes (not shown) are used to identify the type of message and the word length.

The three bytes of the Source Address are similarly formatted except that they are used to define the source or origination station rather than the destination address of a message transmission. Also, the bit corresponding to the bridge flag in the destination address has no significance and is not used in the source address. The bridge flag, which is the first bit transmitted as part of the data packet header, directs or routes the data packet between the LAN of the source station and the associated bridge interface. In particular, if the bridge flag is set to 0, the stations connected to the LAN will respond to the data packet but the associated bridge interface will not respond. Conversely, if the bridge flag is set to 1, only the bridge will respond to the data packet and the stations connected to the LAN will not respond.

Figure 4:
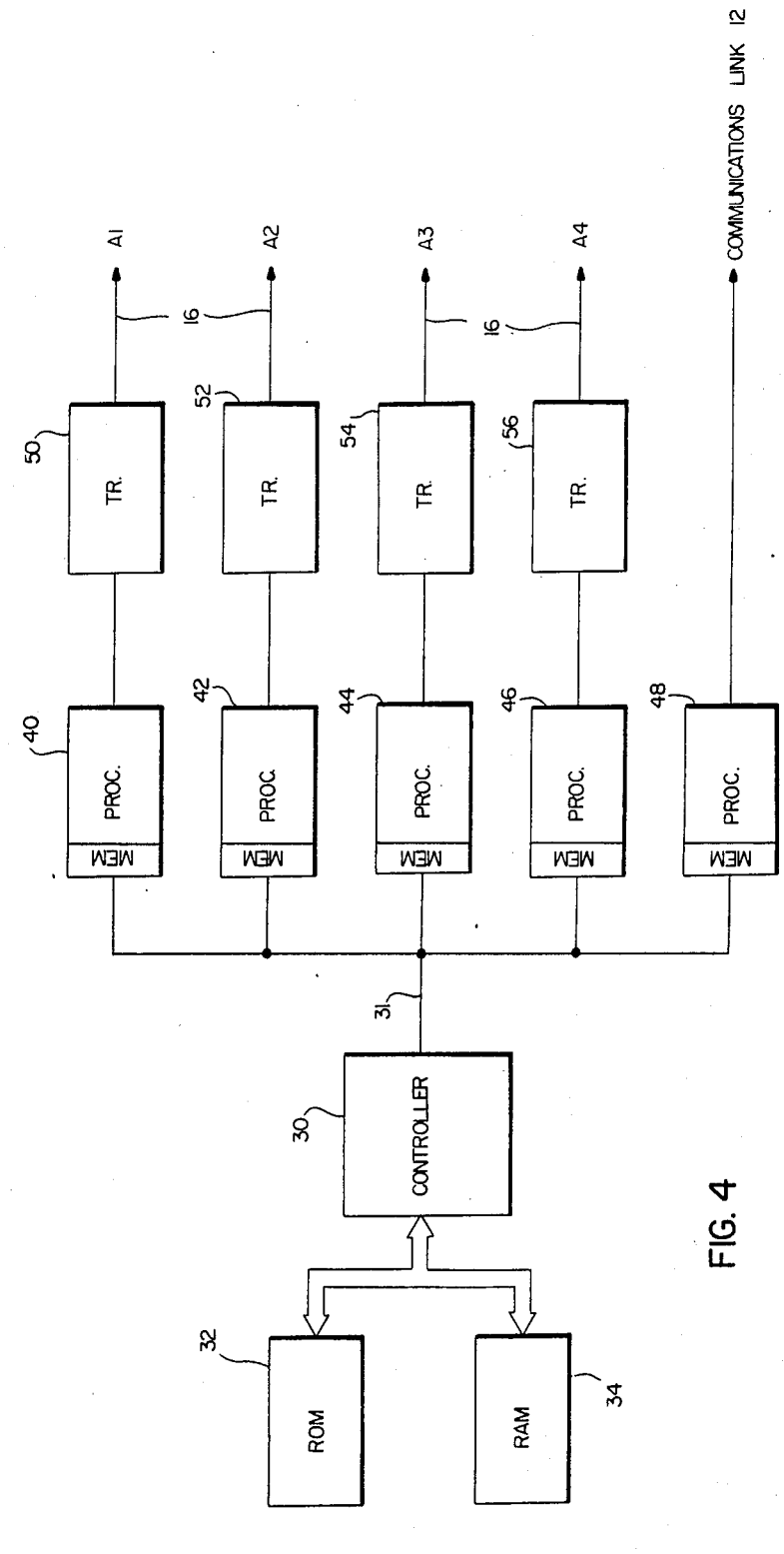
FIG. 4 is a block diagram of a bridge interface.

The bridge interfaces BA, BB ... BN are represented by the block diagram of FIG. 4. The bridge comprises a microprocessor based controller 30, a programmed ROM 32 for controlling the operation of controller 30 and a RAM 34 for temporary storage of data. Controller 30 is coupled to five processors 40, 42, 44, 46 and 48 by a line 38, each processor including internal memory sufficient for storing a data packet. In particular, each processor samples the bridge flag of every packet transmitted on its LAN and stores the entire packet in its internal memory only if the flag is 1. If the flag is 0, the packet is ignored by the processor. Processors 40-46 in turn are coupled to four RF modems 50, 52, 54 and 56, each of which is coupled to the cable plant 14 of a respective sub-channel or LAN (e.g., A1, A2, A3 and A4) by a line 16. Processor 48 is coupled to communications link 12 for communications between networks.

In operation, assume, for example, that a station S1 of sub-channel or LAN A1 wishes to transmit a data packet to a station S2 that is also located within LAN A1. Assume further that: source station S1 has a station address of 9873 (decimal equivalents of binary code values are used herein for convenience); destination station S2 has a station address of 3564; communications network A has a channel identification code of 23; and LAN A1 has a sub-channel number of 3. Controller 20 of source station S1 formulates the desired data packet which includes a header of 9873-23-3-0/3564-23-3-0. It will be observed that the bridge flag of the header is set to 0 such that the stations connected to LAN A1 may respond to the packet but bridge BA will not respond. The formulated data packet and header, is transmitted by modem 28 of source station S1 as modulation of carrier frequency f1 (corresponding to sub-channel number 3) on the reverse channel of cable plant 14. The transmitted packet is received by the network translator NT of LAN A1 and retransmitted on the forward channel of cable plant 14 as modulation of carrier frequency F1. The bridge BA does not respond to the packet since the bridge flag in the header is 0. However, the packet is received by destination station S2 and its modem 28 passes the received packet for storage in RAM 24 under the control of controller 20. To confirm receipt of the packet destination station S2 transmits a confirmation data packet back to source station S1. The confirmation data packet includes a header of the form: 3564-23-3-0/9873-23-3-0. As before, the confirmation packet is transmitted from station S2 through cable plant 14 as modulation of the carrier frequency f1, converted to carrier frequency F1 by the network translator of LAN A1 and retransmitted on the forward channel of the cable plant for receipt by station S1. Again the bridge BA does not respond since the bridge flag is set to 0.

Assume next that station S1 desires to communicate with a station S3 that is in a different sub-channel or LAN A4 in the same communications network or channel A. Since the stations are in two different LANs, communication is effected through bridge interface BA. Consequently, the bridge flag of the packet header is set to 1. If station S3 has a station address of 6425 and LAN A4 a sub-channel number of 2, the data packet transmitted by source station S1 includes a packet header of 9876-23-3-0/6425-23-2-1. The data packet is transmitted by source station S1 at the carrier frequency f1 of subchannel A1 on the reverse channel of carrier plant 14, converted by the network translator of LAN A1 to carrier frequency F1 and retransmitted on the forward channel of the cable plant. Since the bridge flag of the packet header is set to 1, the stations in LAN A1 will not respond to the retransmitted packet. Instead, processor 40 of bridge BA detects the bridge flag in the header of the data packet coupled to it by line 16 and modem 50 and, in response thereto, temporarily stores the packet in the processor memory. Processor 40 then interrogates the first byte of the stored packet and, based upon this interrogation, processor 40 establishes that the intended destination station of the packet is in sub-channel A4 (sub-channel number 2) of channel A (channel identification code 23). The message type (i.e., whether it is a connection request or a confirmation) and word length are also determined. The packet is transferred from processor 40 via controller 30 to RAM 34 and therefrom to the internal memory of processor 46 for transmission via modem 56 and line 16 on the reverse channel of cable plant 14 of LAN A4 as modulation of carrier frequency f4. In this packet header, the bridge flag is reset to 0 by processor 46 to enable receipt thereof by the stations of LAN A4. The transmitted packet is then converted to frequency F4 by the network translator of LAN A4 and retransmitted on the forward channel of cable plant 14 where it is received by destination station S3. Station S3 subsequently formulates and transmits a confirmation packet back to station S1 in a similar manner. In particular, the confirmation packet includes the header of 6425-23-2-0/9876-23-3-1. The packet is received by bridge BA and its header modified to 6425-23-2-0/9876-23-3-0 prior to transmission on LAN A1. Thus, the only difference between the original and modified headers resides in the bridge flag which is 0 in the modified header to enable receipt of the confirmation packet by station S1.

A somewhat similar process is used to communicate between stations in different channels, that is, the stations that are not in communications network A, such as between station S1 in LAN A1 of channel A and station S4 in LAN B1 of channel B. Assuming that the intended destination station S4 has a station address of 3564, communications network B has a channel identification code of 14 and that LAN B1 has a sub-channel number of 2, the data packet originated at the source station S1 of LAN A1 has a header of 9873-23-3-0/3564-14-2-1. This packet is sent on the reverse channel of LAN A1 and received, converted and rebroadcast on the forward channel of LAN A1 by the associated network translator. The rebroadcast packet is received by bridge BA and stored in the internal memory of its processor 40. Since the destination station S4 is identified in the header as being in network B, the packet is transferred by a controller 30 to RAM 34 and therefrom to the internal memory of processor 48 for transmission over the external communications link 12 to bridge BB of the destination station S4. Bridge BB subsequently receives the transmitted packet and, as described above, modifies its header to 9873-23-3-0/3564-14-2-0 and transmits the packet on the reverse channel of cable plant 14 of LAN B1, where it is received, converted and transmitted on the forward channel of the cable by the associated network translator for receipt by destination station S4. The confirmation packet from station S4 follows a reverse routing back to station 1 through bridge BB, communications link 12, bridge BA and the forward channel of cable plant 14 of LAN A1. It will be appreciated that details of the communication link are not illustrated since the communication link forms no part of the present invention and many different forms of well known communication links may be used for effecting interbridge communications between stations of LANs in different networks. Those skilled in the art will thus recognize that in any communications involving stations with known addresses and locations, only short term storage of the data packet sufficient to allow for its interrogation is required in the bridges. This, of course, materially simplifies and effectuates rapid communications within the system.

In some instances, a source station such as S1 may wish to communicate with a destination station, the address of which is known but the channel code or sub-channel number is unknown. For example, source station S1 of LAN A1 may wish to communicate with destination station SN knowing only a station address 3564. Such communications may be very efficiently effected according to the invention by incorporating a specified header, referred to as a broadcast header, as described below.

Figure 5:
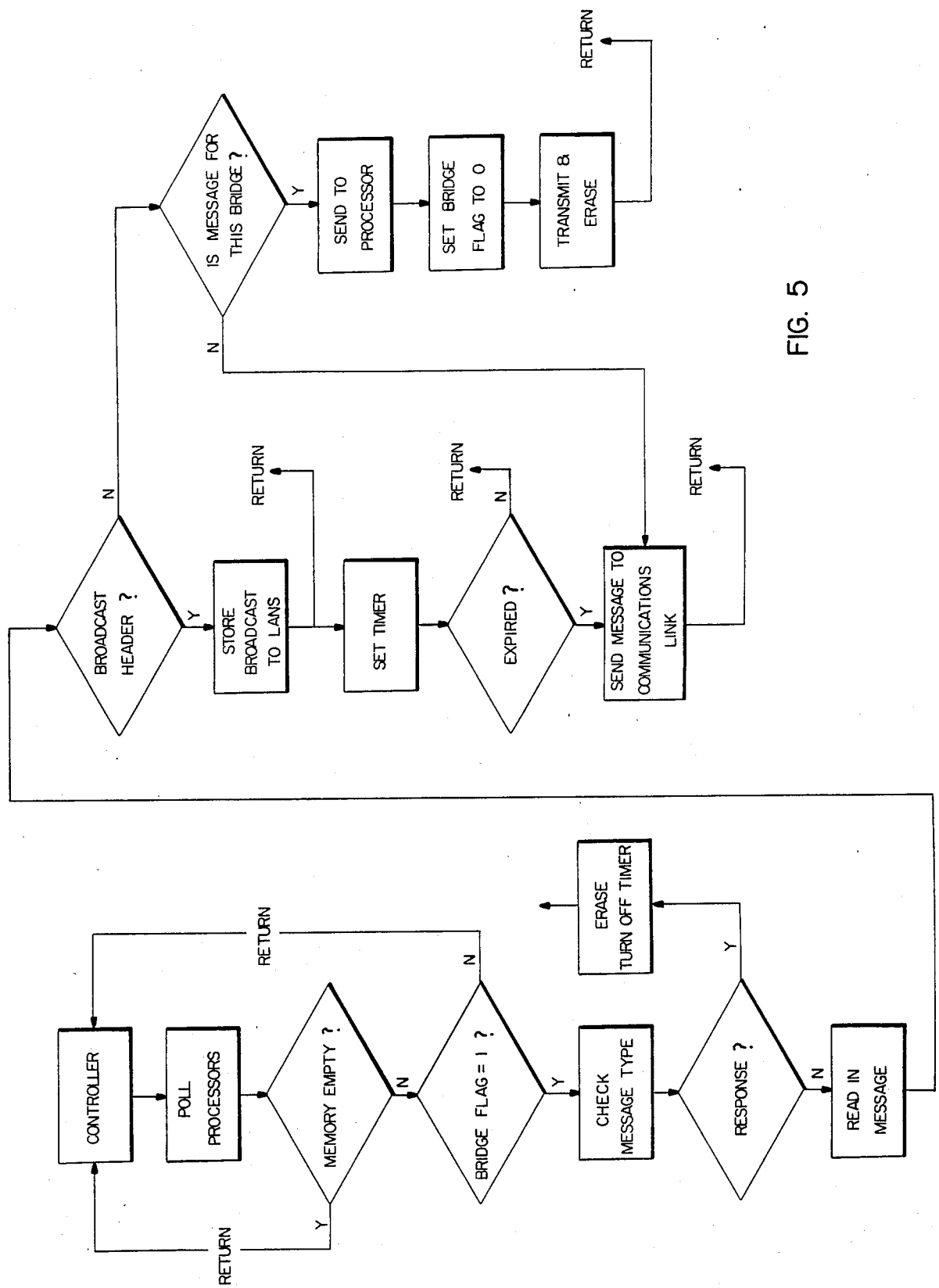

The flow chart of FIG. 5 indicates bridge operations. Controller 30 regularly scans or polls processors 40–48 to determine the status of their internal memories. If a memory is empty, the controller sequences to the next processor. If a memory is not empty, its header is interrogated to see if it corresponds to a "broadcast" header, i.e., a special all 1's code to be described in further detail hereinafter.

As mentioned above, a broadcast header is a special code in which all bits of the channel and sub-channel identification codes (and the bridge flag) are set to 1. This special code is incorporated in the destination address by a source station when the channel or sub-channel identification codes of a destination station are unknown. If such a broadcast header is detected, the associated packet is stored in RAM 34, a timer is set and the data packet is broadcast to all sub-channels connected to the bridge. To effect this transmission, the bridge flag in the header is changed to 0.

In more detail, source station S1 formulates the desired data packet with the special "broadcast" header in which all of the bits of the first byte in the Destination Address portion are set to 1. This indicates an unknown destination channel and sub-channel for the message. The header would thus have the form: 9873-23-3-0/3564-31-3-1 (decimal 31 equalling binary 11111 and decimal 3 equalling binary 11). The packet, including the header, is received by bridge BA (the bridge flag being 1) wherein, in response to the broadcast header code, processor 40 couples the message packet from its internal memory via controller 30 for storage in RAM 34. The timer is set and the stored packet is transmitted via modems 50, 52, 54 and 56 on all four sub-channels A1, A2, A3 and A4 of channel A with appropriate channel and sub-channel codes and with the bridge flag of each header set to 0. The Destination Address of each header includes the destination station address, channel A identification code, the respective sub-channel number of the LAN on which it is transmitted and a 0 bridge flag. As a consequence, if the destination station (address 3564) is in any of the LANs A1–A4, such station will receive the broadcast packet and respond with a confirmation packet, the comfirmation packet including the confirming stations channel and sub-channel identification codes.

The confirmation packet is stored in internal memory of one of the processors 40–46. Since the header of the stored packet is not a broadcast header, the packet is further interrogated to determine whether it is a confirmation packet and if so, whether it is a confirmation of the original "broadcast" packet stored in RAM 34. In this event, the timer is turned off and the packet erased from RAM 34. Next, the confirmation packet is coupled via controller 30 and RAM 34 to the processor 40–46 associated with source station S1 for transmission on its LAN. At this time, the bridge flag of the re-transmitted confirmation packet is set to 0 to enable receipt thereof by source station S1. Since the confirmation packet includes the full identification of the destination station further packets will have fully specified headers to avoid the need for the above-mentioned processing by the bridge. If a confirmation packet is not received by the bridge before the timer times out, the "broadcast" packet will be transmitted on communications link 12 to the other bridges and erased from RAM 34. The other bridges will process the "broadcast" packet in a manner similar to that described above.

As mentioned above, if a packet is received by the bridge which does not contain a "broadcast" header, the packet is interrogated to determine whether it is a confirmation packet. If the packet is a confirmation packet but not one corresponding to a previously "broadcast" packet stored in RAM 34, the packet is coupled to the appropriate processor for transmission back to the source station (with its bridge flag being set to 0). If, on the other hand, the packet is not a confirmation packet, e.g., a connection request packet, a determination is made as to whether the packet is destined for a station in the channel associated with the bridge or to a station in a channel associated with a different bridge. In the latter case, the message is transmitted on communications link 12 to the other bridge via processor 48. Otherwise, it is coupled to one of processors 40–46 for transmission (with a 0 bridge flag) on the appropriate LAN of the bridge.

It will be appreciated that the memory comprising RAM 34 may be segregated into cells which are accessed by the controller on an "as needed" basis. Such arrangements are well known and form no part of the invention.

FIG. 6 illustrates a flow diagram for a station in a LAN. Data is obtained from a user from a PC or the like and formatted into data or message packets. A header as described above is formatted by the station hardware/software. The header identifies the source station, destination station, message type, word length, etc. If the bridge and sub-channel of the destination station are known, and if the station is the same LAN, the bridge flag is set to 0. For other destination stations, the bridge flag is set to 1. If either the channel or sub-channel is unknown, a broadcast header is included, which includes all 1's for the channel identification code and LAN number (and the bridge flag). When the forward channel assigned is free, the message packet is sent.

In FIG. 7, a flow diagram for a station receiving a message packet is shown. The reverse channel is monitored for headers where the bridge flag is 0. If the flag is 1, the message is for the bridge and the stations do not respond. If a header has a bridge flag of 0, the address is compared with the station address, and if matched, the data is put into memory. The message is processed and sent to the user and a confirmation message sent to the sender.

In accordance with the foregoing, communications between stations of different LANs is conveniently effected without the use of costly and low-speed bridge look-up tables even when the location of the LAN of a selected destination station is unknown.

What is claimed is:

1. In a communications system:
   a channel comprising a plurality of LANS including multiple stations;
   bridge means associated with said channel for effecting communications between stations in different LANS of said channel;
   means at each station for formatting and transmitting a data packet with a header including either a first or a second bridge signal;
   each station including means responsive only to a transmitted data packet including a header having said first bridge signal; and
   said bridge means including means responsive only to a transmitted data packet including a header having said second bridge signal for coupling said data packet to a selected destination station while altering said second bridge signal to said first bridge signal.

2. The system of claim 1, wherein said first and said second bridge signals comprise the presence and absence. respectively, of a single digit bridge flag.

3. The system of claim 2, wherein each station and each LAN is identified by a respective address and wherein each said header includes the address of the source station and the destination station.

4. The system of claim 3, further including means at each station for formatting a broadcast header, including said second bridge signal where the destination station address is not known; and
   wherein said bridge means, responsive to said broadcast header, interrogates all stations in all LANS of its channel.

5. The system of claim 4, wherein said bridge means includes a connection for communicating with stations outside said channel and wherein said header includes a channel address; and
   channel address matching means at said bridge for responding to data packets originating outside said channel for destination stations having channel addresses corresponding to that of said bridge means.

6. The system of claim 5, wherein said broadcast header also includes a particular channel and LAN address.

7. The system of claim 6, wherein said broadcast header comprises an identical series of binary digits.

8. A communications system comprising:
   a channel comprising a plurality of LANs having multiple stations;
   a bridge associated with said channel for effecting communications between stations in different LANs of said channel;
   each station and each LAN having respective addresses;
   means at each station for formatting and transmitting a data packet having a header including digitally encoded source station, channel and LAN addresses and digitally encoded destination station, channel and LAN addresses and a single digit bridge flag having a first value for destination stations located within the source station LAN and a second value for destination stations located outside the source station LAN:

means at each station for responding only to a data packet having a header with a bridge flag of said first value; and means at each bridge responsive to a data packet having a bridge flag of said second value for changing said bridge flag to said first value while coupling said data packet to the destination station.

9. The system of claim 8, further including means at each station for formatting a broadcast header where the destination station, channel or LAN address is unknown and means at each bridge responsive to said broadcast header for transmitting said data packet to all LANs in its channel.

10. A method of communication among a plurality of stations in a channel having different LANs and including bridge interface means connected to the channel comprising the steps of:

at each station;

formatting, when required, a data packet having a header including a source station address and LAN number and a destination station address and LAN number and a bridge flag set to a first value for communications with destination stations within its LAN and to a second value for communications with destination stations outside its LAN;

ignoring a data packet with a header having a bridge flag set to said second value;

responding to a data packet with a header having a bridge flag set to said first value and having a destination station address corresponding to its station address;

at each bridge interface means;

determining the value of a bridge flag in the header of a data packet;

ignoring a data packet with a header having a bridge flag set to said first value; and changing a bridge flag set to second value in the header of a data packet to said first value while coupling said data packet to the destination station LAN.

11. The method of claim 10, wherein each station can format a data packet with a broadcast header, including a bridge flag set to said second value, for a destination station LAN number that is not known, comprising the further steps of:

at each bridge interface means;

sensing a broadcast header in a data packet;

changing said bridge flag to said first value; and transmitting said data packet to all LANs in its channel.

12. The method of claim 11, further including the steps of:

at each bridge interface means;

setting a time period within which a response to a data packet transmitted to all LANs in its channel is to be received; and storing said data packet for a period of time not longer than the time period set.

* * * * *